(12) United States Patent
Stout

(10) Patent No.: US 9,041,899 B2
(45) Date of Patent: May 26, 2015

(54) DIGITAL, VIRTUAL DIRECTOR APPARATUS AND METHOD

(71) Applicant: JIGABOT, LLC, Highland, UT (US)

(72) Inventor: Richard F. Stout, Highland, UT (US)

(73) Assignee: JIGABOT, LLC, Highland, UT (US)

( * ) Notice: Subject to any disclaimer, the term of this patent is extended or adjusted under 35 U.S.C. 154(b) by 315 days.

(21) Appl. No.: 13/744,230

(22) Filed: Jan. 17, 2013

(65) Prior Publication Data

US 2013/0182225 A1 Jul. 18, 2013

Related U.S. Application Data

(60) Provisional application No. 61/587,752, filed on Jan. 18, 2012.

(51) Int. Cl.
| | | |
|---|---|---|
| *G03B 21/14* | (2006.01) | |
| *G03B 15/10* | (2006.01) | |
| *G03B 19/18* | (2006.01) | |
| *G03B 21/32* | (2006.01) | |
| *G03B 15/06* | (2006.01) | |

(52) U.S. Cl.
CPC ............... *G03B 15/10* (2013.01); *G03B 15/06* (2013.01)

(58) Field of Classification Search
USPC .............. 352/38, 44, 48, 85, 88, 89; 353/28
See application file for complete search history.

(56) References Cited

U.S. PATENT DOCUMENTS

| | | |
|---|---|---|
| 5,179,421 A | 1/1993 | Parker et al. |
| 5,268,734 A | 12/1993 | Parker et al. |
| 5,331,359 A * | 7/1994 | Leclercq .......................... 353/28 |
| 5,517,300 A | 5/1996 | Parker et al. |
| 5,790,124 A * | 8/1998 | Fischer et al. ................. 345/629 |
| 6,608,688 B1 | 8/2003 | Faul et al. |
| 6,769,771 B2 * | 8/2004 | Trumbull ........................ 352/243 |
| 6,801,637 B2 | 10/2004 | Voronka et al. |
| 7,071,898 B2 | 7/2006 | Hobgood et al. |
| 7,312,872 B2 | 12/2007 | Ohta |
| 7,468,778 B2 * | 12/2008 | Thomas et al. .................. 352/85 |
| 8,031,227 B2 | 10/2011 | Neal et al. |
| 2006/0262961 A1 | 11/2006 | Holsing et al. |
| 2011/0228098 A1 | 9/2011 | Lamb et al. |
| 2014/0098241 A1 | 4/2014 | Stout et al. |

OTHER PUBLICATIONS

U.S. Appl. No. 14/508,813, filed Oct. 7, 2014, Stout et al.
U.S. Appl. No. 14/502,156, filed Sep. 30, 2014, Stout et al.
(Continued)

*Primary Examiner* — William C Dowling
(74) *Attorney, Agent, or Firm* — Workman Nydegger

(57) ABSTRACT

In a computerized film (digital camera action) production system, a virtual director module takes responsibility for creating sets, and enabling cinematography by creating a synthetic parallax matching of a "set" image to what would have existed before a camera in real motion about the physical location represented. This overcomes failures typical of "green screen" technology in dealing with such conditions as shallow depth of field and low light. Computer generated, synthetic sets from a 3D animator may be projected behind real actors during or after filming. Sythetic sets are seen through a virtual camera as photo-realistic because they are skinned with textures, and structured geometrically, to match reality represented by actual still photography of a physical environment, such as buildings, walls, streets, landscapes, props, and the like.

15 Claims, 8 Drawing Sheets

(56) References Cited

OTHER PUBLICATIONS

U.S. Appl. No. 14/504,634, filed Oct. 2, 2014, Stout et al.
U.S. Appl. No. 14/507,494, filed Oct. 6, 2014, Stout et al.
U.S. Appl. No. 29/503,885, filed Sep. 30, 2014, Shelley et al.
Mase et al.; Interaction Corpus and Experience Sharing; ATR Media Information Science Laboratories; Nagoya University; Kyoto University; Jan. 2003.
Papanikolopoulos, et al.; Visual Tracking of a Moving Target by a Camera Mounted on a Robot: A Combination of Control and Vision; IEEE Transactions on Robotics and Automation; vol. 9, No. 1; Feb. 1993.
Svoboda et al.; "A Convenient Multi-Camera Self-Calibration for Virtual Environments," Center for Machine Perception; Department of Cybernetics; Czech Technical University in Prague; Aug. 14, 2005.
International Search Report and Written Opinion in corresponding Application No. PCT/US14/11094 dated Jun. 6, 2014.

* cited by examiner

DIGITAL, VIRTUAL DIRECTOR APPARATUS AND METHOD

RELATED APPLICATIONS

This application: claims the benefit of co-pending U.S. Provisional Patent Application Ser. No. 61/587,752, filed on Jan. 18, 2012; which is hereby incorporated by reference.

BACKGROUND

1. The Field of the Invention

This invention relates to cinematography and, more particularly, to novel systems and methods for virtual set creation and filming.

2. The Background Art

Cinematography involves the lighting, cameras, actors, props and other components required to film or photograph in moving format a story set in an environment, known as a set. Lighting is very important, actors likewise. Meanwhile, backgrounds may be created by filming on location. Similarly, backgrounds may be created by building a miniaturized set and taking great pains to photograph that miniature set and create an artificial background. Similarly, other mechanisms for filming an environment, such as front or rear projection, wherein a background "plate" of a scene is shot with one camera and later on that background is projected onto a screen in front of which actors are acting. This is another traditional mechanism for creating a background at a different time and a different place from the action that is photographed involving actors.

Nevertheless, such technologies cannot easily accommodate the parallax shift, the angle change, or the apparent angle change that is inherent in actual movement of a camera past a scene. To solve such parallax problems with screen projection technologies, computer controlled mechanical motion-capture jib devices must be used originally to film background plates, and then those same motion-capture devices must be later used within a soundstage, when the background plate is projected, to simultaneously film the foreground actors and other elements with precisely the same camera movements with which the plates were originally shot. This process can be very expensive.

Accordingly, in more recent decades, "green screen" technology has been used. This is most commonly observed on television when a weather person stands in front of an apparent screen, pointing or demonstrating with a hand toward the screen, but all the time looking at an orthogonal direction where that weather reporter is actually looking at the image that the television viewer is seeing. In other words, the weather person must watch himself on TV to know where he is in respect to the map because the map does not exist. That is, the map is virtual, and the weather person is actually standing in front of a green screen that is being edited out by the manipulation of the image and replaced by the weather map.

Green screen cinematography is used extensively in film making to place people within virtual environments. By filming actors in front of a green screen, post processing, or realtime processing, may rely on images taken of a background scene with a camera that is moving. Thus, that camera may actually move past, for example, a building, first seeing one side, then passing to front, then seeing the other side, and finally seeing the building recede in the peripheral vision of the user and of the camera. Thus, if the green-screen filming of actors and other foreground objects replicates this camera movement precisely, using motion-controlled hardware and software, this tends to solve the parallax problem. More recently, virtual 3D models have been created and linked to virtual cameras within 3D modeling software programs like Maya or Blender, to be combined with real-world camera recordings of actors and other foreground subjects, using match-moving software, to "sell" a shot with parallax. Nevertheless, green screens still leave many existing problems.

For example, shallow depth of field is critical in closeup shots, and often artistically preferable in many others, such as medium shots, or over-the-shoulder shots. That is, as a combination of the focal length, the proximity, the aperture, and other camera parameters, the depth of field becomes very short. Thus, actors may barely be within the total depth of field, and often actors would not be completely in focus for a shot. Thus, backgrounds would naturally be blurred. A 3D modeled scene that has been shot separately from the green-screen action of the actors will typically not have a proper depth of field illustrated in the composited shot without expensive, post-production image manipulations.

Likewise, green screen technology depends on "edge finding" algorithms, which try to recognize the edges of an object to be maintained or kept and other elements that are to be removed from an image. For example, the green screen may be removed by color. Meanwhile the edges of a hat, a hairdo, or the like may actually not be in complete focus or may not be easily detected as edges. Accordingly, even with the top green-screen removing technologies, hat, hair, or head images may be shrunk, resulting in more of an image removed than should have been, and other artifacts become introduced that tend to destroy the integrity of an image. This is particularly problematic in situations of focus shifting, or racking, between subjects, which is a very common tool in a cinematographer's toolbox.

Meanwhile, differentials in lighting cause additional problems with green screen technology. For example, if one part of an image is comparatively darker and has less lighting, intentionally or unintentionally, that artifact may be lost. If a green screen behind a blurred image is darker than other portions of the green screen, a clean "matting" out of the green becomes virtually impossible. Where an actor who is principal in a scene or a shot is to be better lighted than other actors and elements in the background, those background elements may be lost with green screen technology because the edge finding technology and the separation technology to separate the green screen from the images desired may completely eliminate or partially eliminate those elements.

Meanwhile, green screen technology itself introduces its own artifacts. For example, if lighting is not exactly even, then detection of regions by brightness or color may be difficult. Similarly, the green screen technology typically relies on match moving technology: trigonometric analysis of the image taken in order to calculate the location of a camera in 3D space during the shoot. Thus, if a camera is actually moving, then the green screen must be marked with markers that can be clearly seen and can be clearly detected and removed when replaced with the background images. This is not easily done if focal length or focus changes, if any part of the green screen is not perfectly in focus, if the lighting is not perfectly even along the green screen, and so forth. Meanwhile, any part of an actor or an element of a scene being shot if out of focus may be treated as if it is part of the green screen and removed from the image, or render the computation of the camera's precise location in 3D space impossible without more expensive, or manually intensive solutions.

Thus, in general, many subjects are not easily shot with virtual backgrounds or with green screen technology. Closeup shots, which require an artistically shallow depth of field, shots with shifting focus, shots in which the camera itself is moving, and shots with low lighting, and the like, become very difficult and expensive to shoot with pre-shot plates, or with virtual 3D model sets. And thus physical sets are typically built, or actually locations are used for shooting, with the specific purpose of shooting a single shot, a few shots, or many shots. But shooting within physical locations and with constructed sets within sound stages, can be very expensive.

Thus, in summary, green screen and virtual set technologies become very difficult to use and require much processing of the imaging in order to create credible views. Many common shots are not possible with the technology. And likewise, the building of full sized sets is time consuming, expensive, and is doubly expensive because of the need to maintain full crews of support, as well as full crews of actors while shooting real actors before real props before real sets.

SUMMARY OF THE INVENTION

In view of the foregoing, in accordance with the invention as embodied and broadly described herein, a method and apparatus are disclosed in one embodiment of the present invention as including a virtual director module that takes responsibility for supporting a 3D animator. The 3D animator includes a virtual camera and a virtual set. The virtual set may be created by actual photography of a physical environment, including buildings, streets, landscapes, props, objects, and the like. Meanwhile, the photography need only be still photographs from a typical camera, such as a standard single lens reflex digital camera. By creating records from various images taken of a particular location with its various artifacts, buildings, props, and the like, one may create a database of records containing pictures with identification of the parametric analysis of the camera and the conditions. For example, the focal length, the lens size, the aperture, and so forth may all be recorded in association with each picture. Thus, each of the photographs may then be analyzed according to typical metrics to create a three-dimensional model, either a solid or a three-dimensional surface model of the physical environment that was photographed. By computer processing, a three-dimensional model may then be created of the physical environment that was originally photographed. The three-dimensional model may include interior shots, exterior shots, and a complete structure. In certain embodiments, this will involve solid modeling in three dimensions. In another alternative embodiment, this may involve three-dimensional surface modeling, which is essentially a skin having the proper texture, elements, images, and so forth, and underneath is only represented by a vacuous region, represented, for example, by a wire model. Thus, rendering of the entire solid would not be necessary, especially since it is only the surfaces that can be seen by visible light captured by cameras.

The animator software or animator system may rely on a virtual camera that can traverse throughout the region of the three-dimensional model, as a virtual set. Thus, the three-dimensional model may include various props, lighting, actors, and the like that can be rendered by the three-dimensional animator. Similarly, camera parameters may be input into the 3D animator, such that depth of field, field of view, angle, lighting, and the light may be replicated digitally in the virtual set. In certain embodiments, the 3D animator may output its virtual set to some other output device, such as a memory of a computer or other computer-readable system. Likewise, it may be viewed in a monitor environment. In other embodiments, the 3D animator may output something to a rendering engine that can then be projected on a screen, printed out for a story board, or the like.

In one currently contemplated embodiment, a real set, that is, a physical set, may be set up to include actors, props, lighting, and a real camera. The background may be projected, such as by rear-projection technology, through a semi-transmissive rear-projection screen. The 3D animator may provide the shots making up each of the scenes throughout a movie, all of which may be or some number of which may be illustrated on the rear-projection screen. Meanwhile, closeup shots may involve actual props, and all shots may involve actors, the actors in front of the rear-projection screen, all captured by an actual camera, which then appears to be shooting a fully actualized scene.

In such an embodiment, the 3D animator may feed to the rear-projection projector, endowed with recent technological advances, in real time, or pre-rendered, or simply as a viewing of those images a fully consistent set of images, each parameterized to match the actual camera angle, of the real camera, its focal length, its field of view, its depth of field, and the like. Thus, the 3D model enables the 3D animator to create scenes in real time that are then captured by an actual camera, and which accommodate all the various parameters that may go into a shot had the shot been made within an actual scene. Re-composing can be done in post production to essentially combine pristine, highly polished 3D set renders, with the footage shot on set, to overcome both rear-projection image limitations, if visible for a particular shot, and to maintain shallow-depth of field imagery.

The limitations of green screen technology are thus avoided in a rather straight forward manner. For example, the depth of field may be controlled at will on the actual camera. If an actor is out of focus, or if the background is somewhat out of focus, that lack of focus may be created by the depth of field change on the camera itself, the real camera, or it may be done partly synthetically by the 3D animator feeding to the projector something that is properly unfocussed, as if it were photographed outside of the depth of field.

Similarly, image loss is not a problem. If a background is in shadow, for example, while the actors themselves are lighted, this is not a problem. Lighting may be adapted to the actors themselves within the real set. Meanwhile, the 3D animator provides virtual lighting to the images it is providing to the projector, thus giving complete clarity and choice of lighting level throughout the virtual image. Meanwhile, the actual camera captures everything in its light as provided: the actors in their light, and the synthesized virtual image on the screen at its light level provided.

Similarly, no edge finding is required during the onset shoot. No cutting of images is actually required by green-screen technologies. If postproduction processing is done to overcome projected image problems by replacing pristine 3D rendered imagery, with projected imagery, a combining of the images may be done in a way that does not introduce green colors that must be removed from the images. Moreover, the very expensive and complex process of rotoscoping, which involves manually defining lines constituting edges and then processing images to remove portions on one side or the other of that defined edge when using green screen technologies are no longer required. And if used, would require much less time-consuming precision, and may be largely automated. Thus editing, set building, artistic cinematic limitations, and time-consuming post-production processing are all removed by an apparatus and method in accordance with the invention.

Moreover, with no green screens, markers, separation of portions of images because they are not properly focused and therefore are improperly detected as needing to be removed, are all removed as limitation Likewise, the artistic of depth of field is unmitigated. And perhaps one of the most valuable features is the fact that any background that should be in focus may be maintained in focus while still maintaining the parallax shift that the real camera would have seen had the real camera actually photographed the actors in front of the actual scene that is made into the virtual scene. That is, for example, if a parallax angle shifts as a camera moves within a plane represented by the floor beneath actors and rotates about an axis orthogonal thereto, or if the camera moves in a typical "dolly" move (forward or not) where the 3D background is seen, the parallax shift will be substantial. For example, the camera may move from a front shot to a side to a rear shot and completely pass around a particular actor. The projection screen may simply be placed on a turntable and project the appropriate image on the other side of the actors from the camera. Meanwhile, the virtual image, since the 3D animator may create it to be from any angle, any perspective, any depth of field, may shift the image display on the screen to exactly match the actual parallax angle corresponding to the real angle. And thus traditional rear or front projection system shortcomings are overcome.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
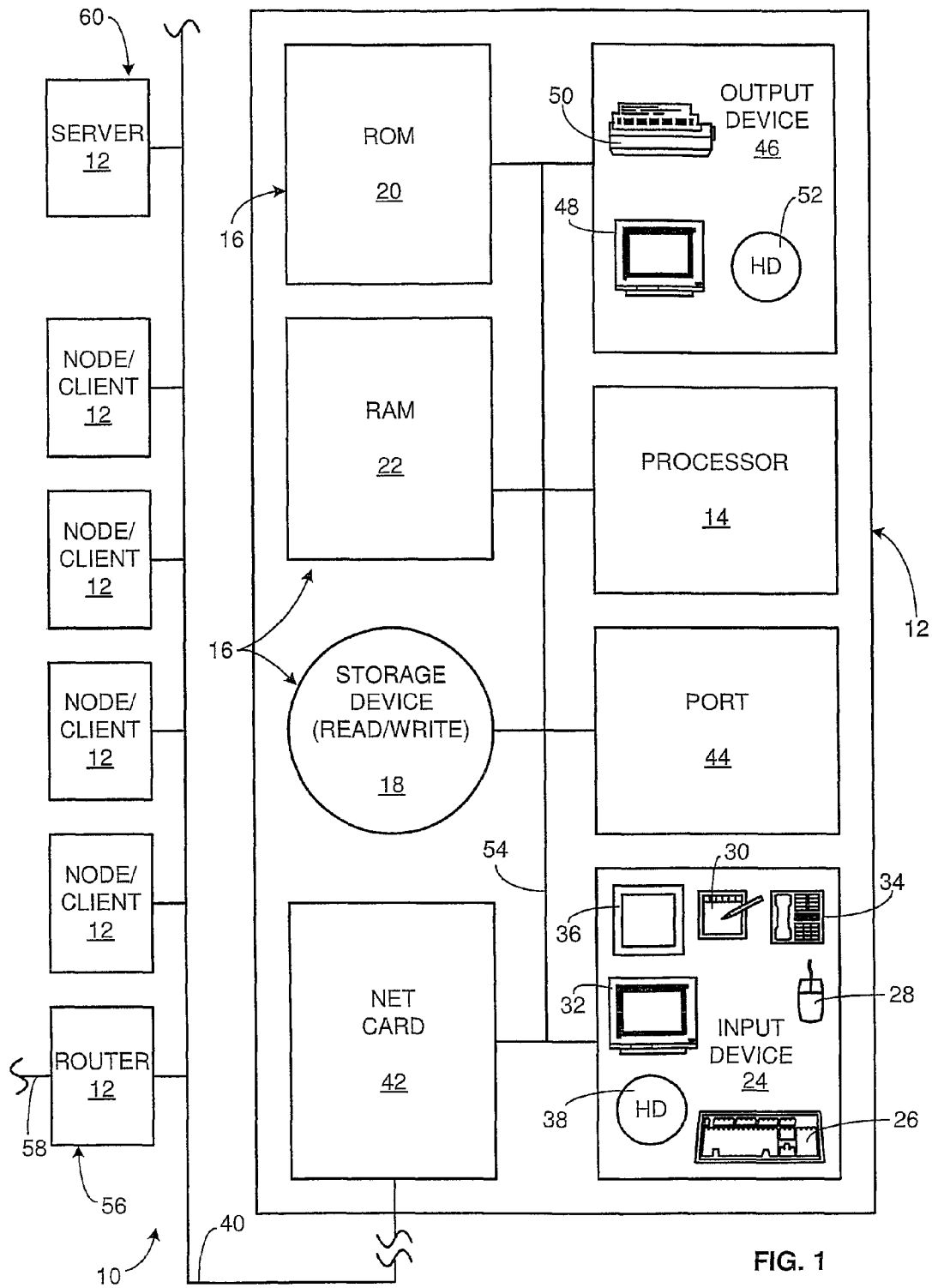
FIG. 1 is a schematic block diagram of a computer system in a network connected to an internetwork, such as the internet for executing software, storing and generating data, and communicating in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
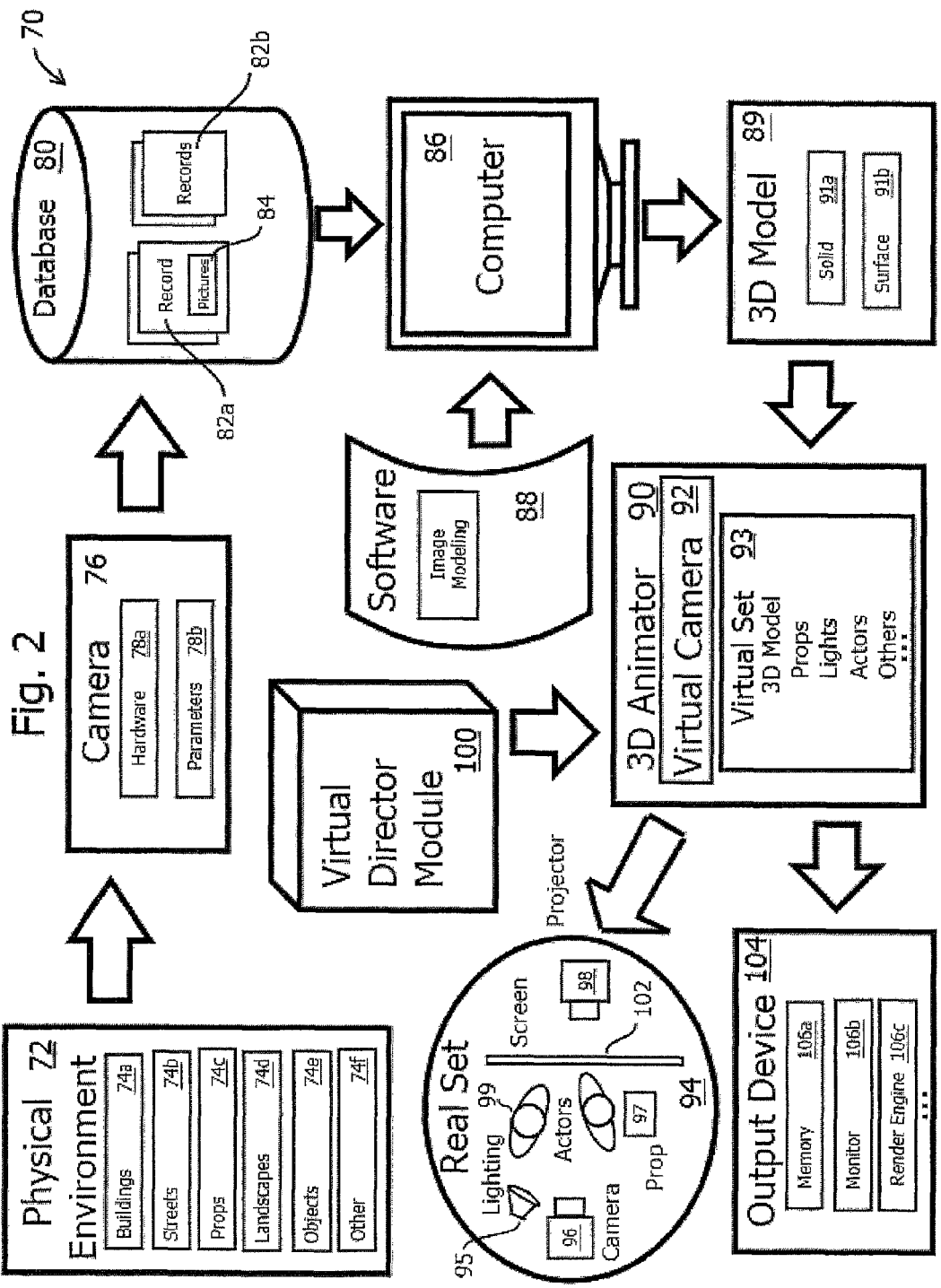
FIG. 2 is a schematic block diagram of a production system in accordance with the invention, including the software, hardware, and other elements effective to implement a system in accordance with the invention.

Referring to FIG. 2, a production system 70 may involve a series of processes, software, hardware, and the like. For example, a physical environment 72 may be an indoor, outdoor, scenic, landscape, or other actual environment. The environment 72 may include mountains, valleys, streams, roads, and the like. Typically, a physical environment may include buildings 74a, streets 74b, props 74c (properties, objects 74c), landscapes 74d, and other objects 74e. Other elements 74f may constitute a part of a physical environment. For example, clouds, sky, night sky, stars, and anything that can be recorded by a camera 76 may be part of a physical environment observed.

In one apparatus and method in accordance with the invention, the physical environment 72 may be observed accidentally, intentionally, on a location-scouting trip, or as an intended shooting. Typically, a director may desire, or may be instructed by a script setting, to place a movie, a scene, or a shot in a particular physical environment 72. Accordingly, one may pick candidate environments and visit them on a "scout" in order to determine their suitability. However, in order to save money, time, keep better records, capture targets of opportunity, and the like, one may actually take a camera 76 and shoot various images of the physical environment 72 visited. This physical environment 72 will eventually become a part of settings for a cinematographic enterprise.

Typically, the camera 76 need only be a single lens reflex or the like. The camera may be a motion picture camera, of either a film type or a digital type, but need not be. Typically, the resolution is better and is completely adequate from a single lens reflex digital camera. Typically, a modern camera 76 may include hardware, including lenses, focal plane array, the camera body, the control systems, and the like. Meanwhile, there may be a processor and various parameters 78b that can be controlled within the hardware 78a of the camera 76.

In one embodiment of an apparatus and method in accordance with the invention, a database 80 may contain various records 82. Hereinafter, a trailing letter following a reference numeral indicates a specific instance of a particular item, and the reference numeral itself includes any or all of that generic item. Thus, records 82a may be records created as a result of the output of a camera 76 in which pictures 84 form a part of a record. The remainder of the record 82a may include the parameter 78b, as well as specification of the hardware 78a of the camera 76. Accordingly, the record 82a with the pictures 84 or images 84 rendered by the camera 76 may completely document the entire physical environment 72 photographed by the camera 76 along with all the camera parameters, such as camera angle, field of view, lens size, lens brand, and all the lens parameters that a cinematographer may desire to know in order to reproduce or otherwise use the pictures 84 and the record 82a.

Other records 82b may represent other information, such as, for example, information regarding the cinematography endeavor, data about the physical environment 72, which also may be included in the record 82a or the like.

In the illustrated embodiment, a computer 86 may operate by executing on the processor 14 thereof software 88, which may include image modeling. The software 88 operating on a computer 86 may render a 3D model 89. By rendering, in this context, is not necessarily intended the actual "rendering," but rather may include the creation of a 3D model 89. That is, a 3D model 89 is actually simply data stored in the memory 16 of the computer 86 (which may simply be an instance of the computer 10 of FIG. 1).

In the illustrated embodiment, software 88 operating on the processor 12 of the computer 10, as represented in this specific instance of a computer 86, may generate the 3D model 89 in one of several formats. For example, the representation of the model 89 may be a solid model 91a. Other embodiments may include a surface 91b.

By "surface 91b" is meant that only the outer surfaces of objects (images, physical objects) from the physical environment 72 photographed by the camera 76 are actually represented by the 3D model 89.

In contrast, a solid model 91a actually treats the articles or items in the 3D model 89 as solid objects. Thus, they have depth, width, height, and so forth. Likewise, their entire volume may require storage of data, representation of materials, dimensionality, and the like. In contrast, a surface model 91b may be a 3D model but models only the surfaces traversing those three dimensions. Thus, a surface model 91b requires much less data to represent it, to store it, and much less processing time in order to regenerate it, or re-render it. Here, by the word "render" is meant the actual production or generation of an image visible on some type of an output device.

The 3D model 89 may be thought of as a mathematical artifact or a set of data that represent an image or the ability to generate an image. That actual image may likewise be animated by configuring a shape, such as the shape of a building, river, mountain, or the like, and storing that shape, or a mathematical representation of that shape, the model 89 may endow that shape with a skin. That skin is actually the image of the surface features, textures, or the like that were actually photographed in the physical environment 72. Thus, tremendous detail, accuracy, and realism (photo realism) are provided by the 3D model 89. Moreover, when done in a 3D surface model 91b, tremendous detail, accuracy, and very rapid generation and rendering are possible.

The model 89 provides the information by way of data to a 3D animator 90. The 3D animator 90 may be thought of as an executable 90 or set of computer programming instructions that represent a virtual camera 92 and a virtual set 93. By "virtual camera 92" is meant the controlling parameters required or desirable to control the representation of the image that becomes a virtual set 93. For example, a camera has a lens angle. That lens angle provides a field of view. Similarly, a lens may be set at a particular aperture size. That aperture affects depth of field and light collection. Similarly, a camera may have a focal length that determines whether it is a closeup lens, a telephoto lens, or the like. Other camera parameters may thus alter the perspective, the image, the net subtended distance, or the like that would be characteristic of or that would characterize an image taken by an actual camera 76. In contrast, the animator 90 creates a virtual camera 92 which parameterizes the virtual set 93 and thus provides image data that will appear, or will render, an image originated from the 3D model 89 but eventually rendered on a set, appearing as if it were actually existent at the time of filming.

Typical elements of a set, including a virtual set 93, may include the 3D model 89 or the data representing the images that exist in the virtual set 93, or will appear to. Likewise, props, representing various items from tables and chairs to automobiles to other items that may exist in a scene, may also be included in the virtual set 93. Likewise, lights, effectively representing the illumination of particular objects, virtual actors, such as images, placeholders, figures that can be moved, and so forth may be provided in virtual set 93.

Other elements that would be part of a physical set may be included in a virtual set 93. In one embodiment, the virtual set 93 may never exist. That is, the features or elements of the virtual set 93 may actually be digital representations of actual photographs of actual items. In the alternative, the virtual set elements may be completely generated synthetically and artificially. Typically, it is desirable to provide photo realistic sets and thus photography-based elements of the virtual set 93 may provide the most convincing and useful items, just as the scenery or setting is best generated from photographs of a physical environment 72.

The 3D animator 90 is largely controlled by a virtual director module 100. The virtual director module 100 will be discussed in greater detail hereinafter. The virtual director module 100 provides to a real director essentially all of the same controls over the animator 90 that that director would have over a physical set, environment, or the like being filmed, photographed, or imaged otherwise.

Meanwhile, the animator 90 may provide the virtual set 93 as an output to any one of several devices. For example, in one currently contemplated environment, the animator 90 outputs a virtual set 93 and the virtual camera 92 (meaning the parameters that will provide camera-light control over the image) to a projector 98 used in an actual set 94 or real set 94. The set 94 includes lighting 95 tailored to the distances, and other requirements of the camera 96 from props 97 and actors 99. Meanwhile, the projector 98 projects the virtual set 93, or a rendering of the data constituted by the virtual set 93 against the semi-transparent screen 102. This is known as a rear-projection screen 102 in the illustrated embodiment. Similarly, the projector 98 and the screen 102 may be arranged in an alternative means, such as provided by front projection approaches.

Meanwhile, the real-world actors 99 act out their parts and recite their lines or deliver their lines in front of a camera 96, which is a real camera photographing the actors 99, the props 97, all under the provided lighting 95.

Meanwhile, the projector 98 provides in accordance with the virtual set 93 an image on the screen 102 that is detected and imaged by the focal plane array of the camera 96. Thus, the camera 96 sees the screen 102 as if the screen 102 were the physical environment 72 that was originally modeled by the 3D model 89 and animated by the animator 90.

In the illustrated embodiment, the animator 90 slaves its virtual camera 92 to the camera 96. Thus, the camera 96, when it changes its azimuthal angle to move from a focus on one actor 99 to another, to a prop 97, to a closeup of an actor 99, or the like, change is made to the image projected on the screen 102. That is, the virtual camera 92 is effectively a software module 92 that controls the rendering or representation of the virtual set 93 according to what the real camera 96 would see had the virtual set 93 actually been extant behind the screen 102 instead of projected onto the screen 102.

Thus, in summary, the virtual camera 92 is a software controller for delivery of the data in the virtual set 93 in order to render a specific image on the screen 102 that is controlled by all the same parameters, set at the same values as those of the camera 96. For example, focal length, depth of field, and the like may all be accommodated. Portions of the virtual set 93 that are supposed to be out of focus because of a narrow depth of field or short depth of field, may actually be unfocussed by the virtual camera 92, by the camera 96, or by both.

Likewise, the field of view, meaning that subtended region of the screen 102 that lies within the field of view (camera angle) of the camera 96 needs to be rendered completely. However, just outside that region (outside the view of the camera 96), the projector 98 may simply project a black region on the screen 102. Thus, rendering is much less demanding on computer processing and need only be complete on the screen 102 when the camera 96 is backed up or opened up to a wide field of view or backed away to the point that the subtended distance covers substantially the entire screen.

In certain embodiments, the animator 90 may output the virtual set 93 to some other output device 104. For example, the virtual set 93 may simply be output to a memory device 106a. Likewise, during planning, blocking, or story boarding, a director may simply output the virtual set 93 to a monitor 106b in order to visualize or to demonstrate to others the vision of the director. Thus, the virtual set 93 provided with props, actors, and the like may actually be used to story board a shot, a scene, or a movie onto a monitor 106b for critique, planning, feedback, or the like. Likewise, the virtual set 93 may be output by the animator 90 to a render engine 106c for rendering in some other environment. For example, a render engine 106c may be part of another enterprise. In such an event, the output may go first to some memory device 106a and ultimately end up in some other rendering engine 106c in another cinematography project entirely different. Thus, just as music tracks, elements, and the like may be borrowed and re-recorded behind other artists, virtual sets 93 may be moved, sold, and reused in other cinematography projects.

For example, the virtual set 93 may be output to a system supporting a green screen project. In such an event, the demands on the green screen system may be greatly relaxed inasmuch as the slaving of the virtual camera 92 to a real camera 96, where the projector screen 102 is replaced by a green screen, in a way which may overcome many of the limitations of green screen technology and the like.

Figure 3:
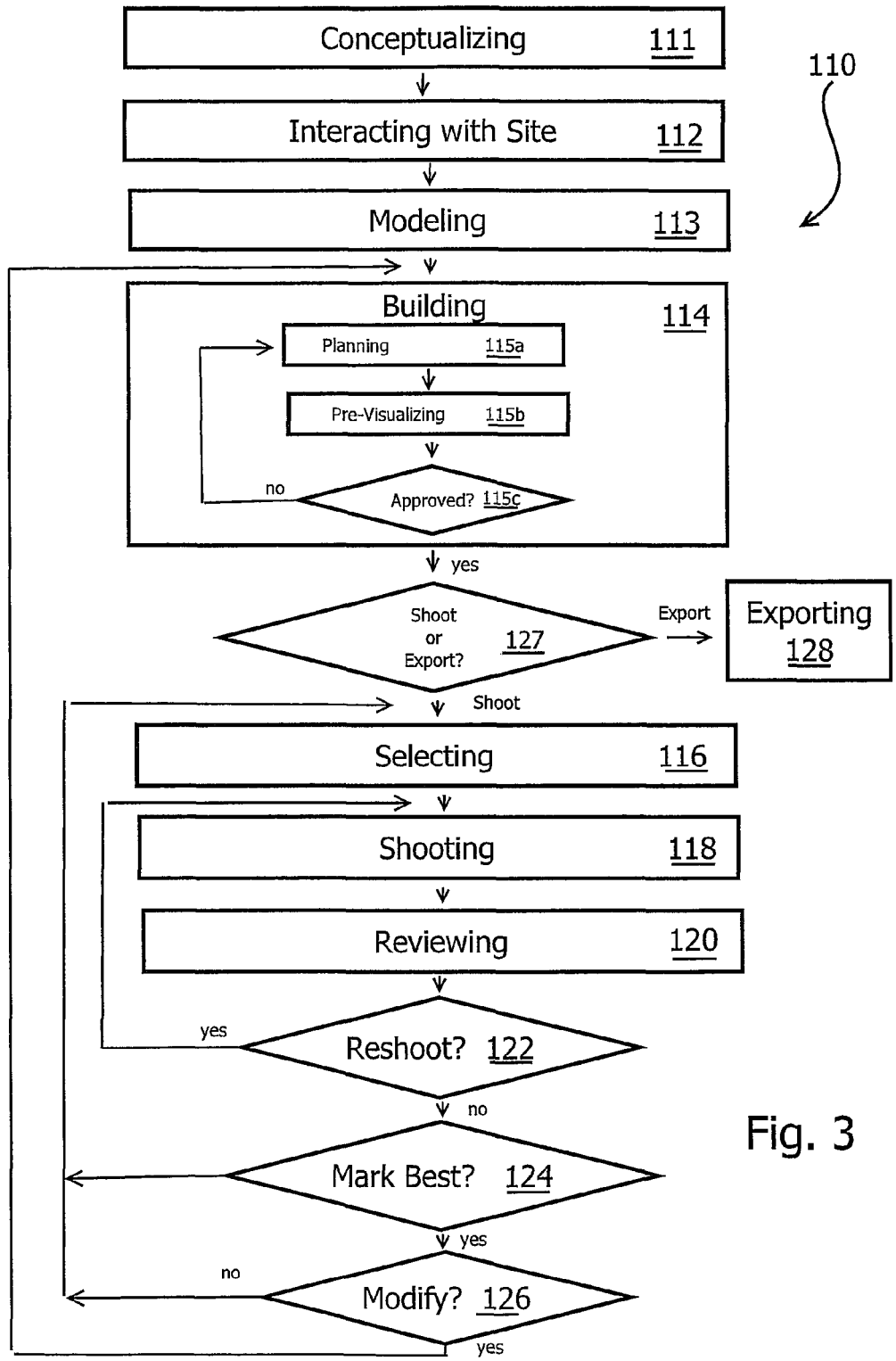
FIG. 3 is a schematic block diagram of a process from concept through exporting a scene or a collection of shots constituting a movie or any portion thereof.

Referring to FIG. 3, a process 110 for scene building using an apparatus and method in accordance with the invention may begin with conceptualizing 111 a story, a movie, a scene, a shot, or the like. As a practical matter, movies are an integrative whole presenting a story. That integrative whole is subdivided into scenes. Scenes, typically, are constituted by a particular setting for environment, particular actors interacting with each other in their roles, and certain other elements. The scene may involve various shots from various angles, a high camera angle shooting down on an image of a group, a low camera angle shooting up at the profile of a vehicle, a person, or the like are typical shot conditions. A shot may be measured in seconds, or fractions of a second known as "frames," and defined by all of the parameters of a set present. Thus, conceptualizing must be done on each shot, including identification of what scene the shot belongs to, who is in the shot, what parts of scenery and the like are in the shot, and so forth.

Typically, when concept or conceptualizing 111 involves a story, a setting, or a physical environment 72, a director or one closely aligned with the director such as a cinematographer may interact 112 with a specific site or physical environment 72. For example, if one were shooting a remake of a Robert Lewis Stevenson novel, such as *Kidnaped* or *Treasure Island*, one may need images of an old Scottish castle. Thus, one may travel to an old Scottish castle or other European location in order to take photographs. Likewise, one may obtain photographs of various Scottish castles from someone who has already interacted 112 with that site and taken photographs. Thus, by one mechanism or another, one may obtain images of the physical environment 72 representing the setting in which one may choose to set a scene.

Interacting 112 results in images, typically still photographs. Modeling 113 may include creating a photorealistic, three-dimensional model of the physical environment 72 imaged by the photography of the interacting 112. Typically, in the interacting step, a single director or cinematographer can take any number of still pictures of a real-world location. For example, interiors of buildings, interiors of aircraft, exteriors of vehicles, buildings, tunnels, fortresses, or other settings that would be very expensive to replicate may be recorded in film or its digital equivalent. Typically, one cannot rent Buckingham Palace for a week or a month of shooting. Nevertheless, from images acquired during interactions with the site 112 over a period of minutes, hours, or days, sufficient photography can provide details of dimensions, textures, features, landscaping, stonework, and the like to be incorporated under modeling 113 of an image that appears to be the actual solid physical environment 72. Typical software for solid modeling 113 includes applications available commercially, such as Autodesk Image Builder software. Likewise, other commercial software and proprietary software is available.

Building a scene involves building 114 individual shots, which will be concatenated together, edited, and so forth in order to build a scene. Meanwhile, building 114 a scene will eventually be combined with the output of other scenes in order to constitute a movie. In the illustrated embodiment, a director or other filmmaker can define by scene and by shot the view of a 3D model from the perspective of a virtual camera that has been modeled by the animator 90. The animator 90 may be custom or may be a commercially available software product such as Autodesk Maya, Blender, or the like. Camera position, lens parameters, and the like may be defined at different points in an animation time line by frame or keyframe. Thus, the building 114 process results in a planning and a pre-visualizing or a simulation of a movie clip (e.g., a shot, a group of shots, a scene, etc.) that would be generated by a real camera against the background of a real-world location corresponding to the physical environment 72 that is represented by the virtual set 93 output by the animator 90.

In building 114, the filmmaker can insert virtual actors, props, lights, and the like until a planned virtual camera's animated playback simulates and pre-visualizes the events that a real world camera would capture in a setting, a scene, a set, or the like.

As a result of the building process 114, sophisticated lighting may be planned and pre-visualized independently from the remainder of the features provided by the virtual director module 100. Likewise, sophisticated movement of a virtual camera may be conducted by changing parameters in the virtual camera 92 with no need for such a camera or such a mechanical system to drive that camera, or to do so in non-traditional ways. The animator 90 simply provides the images that would have been available to the theoretical or hypothetical camera that is represented by the virtual camera 92 from the point of view and so forth of the virtual set 93, with no need to actually create or engage either.

In the illustrated embodiment, the process of building 114 may involve planning 115a. Planning may include blocking out a shot, including consideration of props, lights, actors, camera angles, field of view, depth of focus, proximity of the camera to the action or the actors, and so forth. Thus, one may input the parameters or settings into the animator 90 to control the virtual camera 92 and define the virtual set 93. Accordingly, by sending that output to some output device 104, a director or other filmmaker may pre-visualize 115b the setting, the action, and so forth. If the planning 115a is approved, then a decision 115c advances the process 110 to the next decision 127. However, if the decision 115c is non-approval, then the filmmaker may return to planning 115a and pre-visualizing 115b until the decision 115c results in some approval. Upon approval, the initial decision 127 to shoot or export actual footage or clips and accompanying information, is initially moot. That is, if there has been no shooting done, there are no clips information to be exported, so the first pass through the decision 127 may simply result in moving on to selecting 116.

In the illustrated embodiment, selecting 116 results in selecting a specific scene and shot. Typically, the planning 115a includes all the detailed parameters (keyframes) on a time line for controlling a virtual camera 92 and a virtual set 93. Selecting 116 allows for the initializing of the real-world camera 96, lighting 95, positioning actors 99, and so forth, in accordance with the plan 115a. Likewise, that same time line with keyframes provides specifics about how a virtual set 93 should be projected on the screen 102 for capture by the real-world camera 96. Accordingly, selecting 116 results in precise time line settings controlling parameters for the real set 94 as well as the virtual set 93 to be projected by the projector 98 on the screen 102.

Shooting 118 involves the actual shooting with the camera 96 the action by the actors 99 under the lighting 95 on the set 94. Meanwhile, shooting 118 involves the virtual camera 92 being slaved to the actual camera 96, in order to project onto the screen 102 through the projector 98 all of the appropriate background out the virtual set 93. The virtual actors and props of the virtual set 93 would typically not be projected by the animator 90 via the projector 98. Rather they would be replaced by real-world versions 99 and 97 for shooting 118.

Following shooting 118, reviewing 120 involves the director executing his artistic and technical judgement as to the suitability of the output of the shooting 118. A decision 122 on whether to reshoot the shooting 118 of the shot selected 116 may depend on whether the acting went well, the lighting was as desired, or the like. Meanwhile, the director may also determine whether or not the virtual set 93 gave exactly the desired effect. For example, one may choose to darken a virtual set 93, just as one would remove light from the background of a scene in order to make it more dark, more foreboding, or the like. Thus, if reshooting is to be done, then the decision 122 results in a return to the shooting step 118. If the viewing 120 results in satisfaction with the output of the shooting 118, then the decision 122 results in a decision 122 whether to mark the output as the best shot. That is, if shooting 118 is done repeatedly, a director or another filmmaker may determine whether or not a particular shot should be marked as the best. Accordingly, the decision 124 may be exercised after any particular decision 122, or may be left until afterward, such as for editing.

If one determines to mark a particular shot as the best, then the decision 124 results in marking of that shot as the best version or "take" of the several that have been shot, and the decision 126 is next taken. However, if for any reason, including the fact that one does not want to make a decision 124 on the best shot, or that one will simply leave that decision to later, or one simply desires to experiment and try other parametric variations of lighting, expressions of the actors, and the like, then the decision 124 results in a return to selecting 116 a shot. That is, after shooting 118, if the decision 122 is not to reshoot that shot, and that shot is not to be marked as the best, then the decision 124 results in additional shooting 118, which will require new selecting 116 of a new shot, and the subsequent positioning of camera and lights into position according to the planned 115*a* timeline keyframes.

For example, if one is leaving editing until later, then one may return from the decision 124 to selecting 116 a new shot. Likewise, if one has decided not to mark one of several shots as the best, then the decision 124 results in returning again to selecting 116 the shot to be shot in 118.

Thus, in either event, whether because a shot has not been judged adequate or because one is leaving the editing until later, one may return to the selecting step 116. Ultimately, the decision 126 on whether to modify a shot, if answered in the affirmative, results in returning to the building step 114. In this step one may either plan more, or pre-visualize any or all shots of the scene, within the context of the entire scene. If a shot was selected as best 124, then the pre-visualizing of the scene in 115*b* now substitutes the actual shot from the camera for the planned animated "render" that was originally planned 115*a* and pre-visualized 115*b*. Thus building 114 laterally results in the building, shot by shot, of a rough cut of the scene, which can be pre-visualized in 115*b*. Thus, in the illustrated embodiment of FIG. 3, the decision 126 on whether to modify is a decision on whether to modify the animatic shot of the scene: specifically, to replace the planned 115*a* and visualized 115*b* animation of the shot by virtual camera 92 of the virtual set 93, with an actual shot by camera 96 of real actors 99 and props 97, using lighting 95 within a real set 94, with a virtual background deriving from 89, and projected 98 as controlled by the virtual director module 100 and the 3D animator 90.

If the return to the building step 114 results in non-approval, then planning 115 may begin again. Meanwhile, if approval 115*c* results in an affirmative response, then the decision 127 to shoot or export may now be made with serious substance. If the decision is made to continue shooting, then one returns to selecting 116, shooting 118, reviewing 120, making decisions 122, 124, and so forth. However, if the shooting 118 has been completed for the scene, and the best shots have replaced the planned animations in the animatic, resulting in a rough cut edit being assembled for the scene, then the shots are ready to be exportted via a decision to export 127, and the actual export activity 128. Accordingly, the shot, the scene, or the entire movie may be exported 128 for review, editing, display, or the like using a non-linear editor of choice, including Avid or Final Cut Pro.

In summary, selecting 116 a shot allows a director to put actors in front of the projection screen 102 and add props 97. When the director calls action, and begins shooting 118, the virtual director module 100 may control the real life camera 96 in accordance with the planned 115*a* timeline parameters, and pre-visualized 115*b* perspective of the virtual camera 92.

In the event, however, that the director or cinematographer determines, when selecting the shot 116, to manually control a camera 96, then that camera may be handheld, or hand controlled on a tripod, on a rail, a jib, or the like. Thus, the camera 96 may be moved manually and may be tracked in order to have the position and parameters or parameter setting transferred back to the virtual camera 92. Thus, the virtual camera 92 will alter the output of the virtual set 93 and feed it to the projector 98 in order to alter the output on the screen 102 in accordance with the motion and parametric settings of the controlling parameters of the camera 96. Software such as Autodesk Motion Builder, as well as proprietary software, may both be used to facilitate this.

In the event of selecting 116 to hand hold a camera 96, during shooting 118, the virtual camera 92 tracks and replicates all the same parameters in real time, including location and space, focus, aperture, zoom, and so forth in real time as the real-world camera 96. And in real-time, the projector 98 displays a changing 3D image reflecting the virtual set 93 (typically excluding virtual actors and props 93) that contains the right perspective shift of parallax, which allows the shot to appear as if it had been originally shot at the location of the physical environment 72 reflected by the virtual set 93.

An additional aspect of the shooting step 118 is that imagery can be uniquely captured, including shallow depth of focus, dark lighting conditions in the background of the virtual set 93, or in different locations of the virtual set 93, and the like. Likewise, features that cannot traditionally be captured with green screen technology, such as differentials in depth of focus on the set 94, or depth of field, backlighting that may cause removal of portions of images, and differentials in darkness of the lighting may all be obviated by the lack of any need to use edge finding to remove any part of the image recorded by the camera 96. Thus, the artistic cinematic shots at a low depth of field and low light in all or part of the image recorded by the camera 96 create no significant problem Likewise, as actors move, a system of control as described hereinbelow may permit traveling by controlled lighting, camera, and the like, in order to automatically maintain lens focus, or lighting contrast ratios, as the actor 99 moves.

Figure 4:
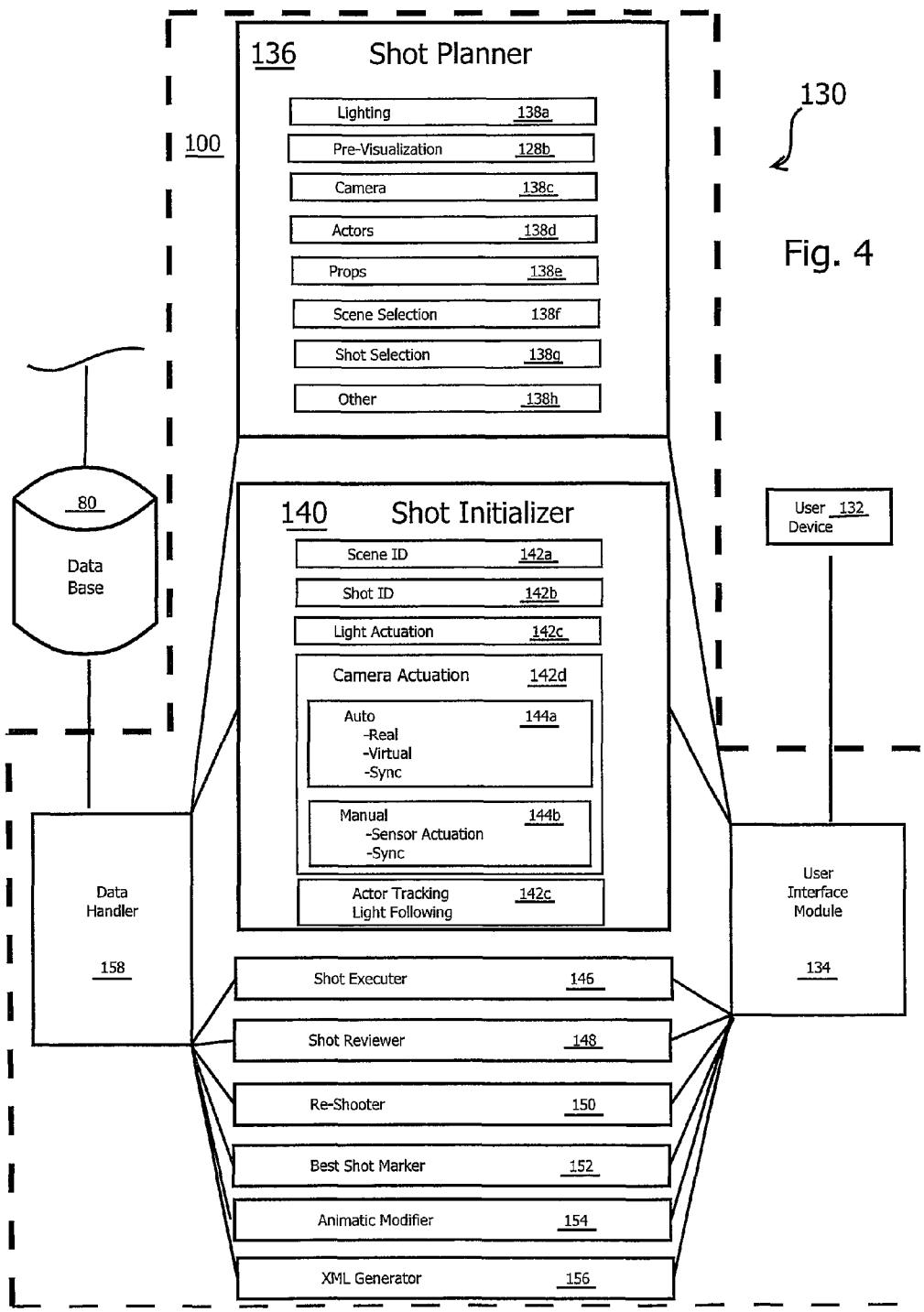
FIG. 4 is a schematic block diagram of a user interface portion of a virtual director module of FIG. 1.
Figure 5:
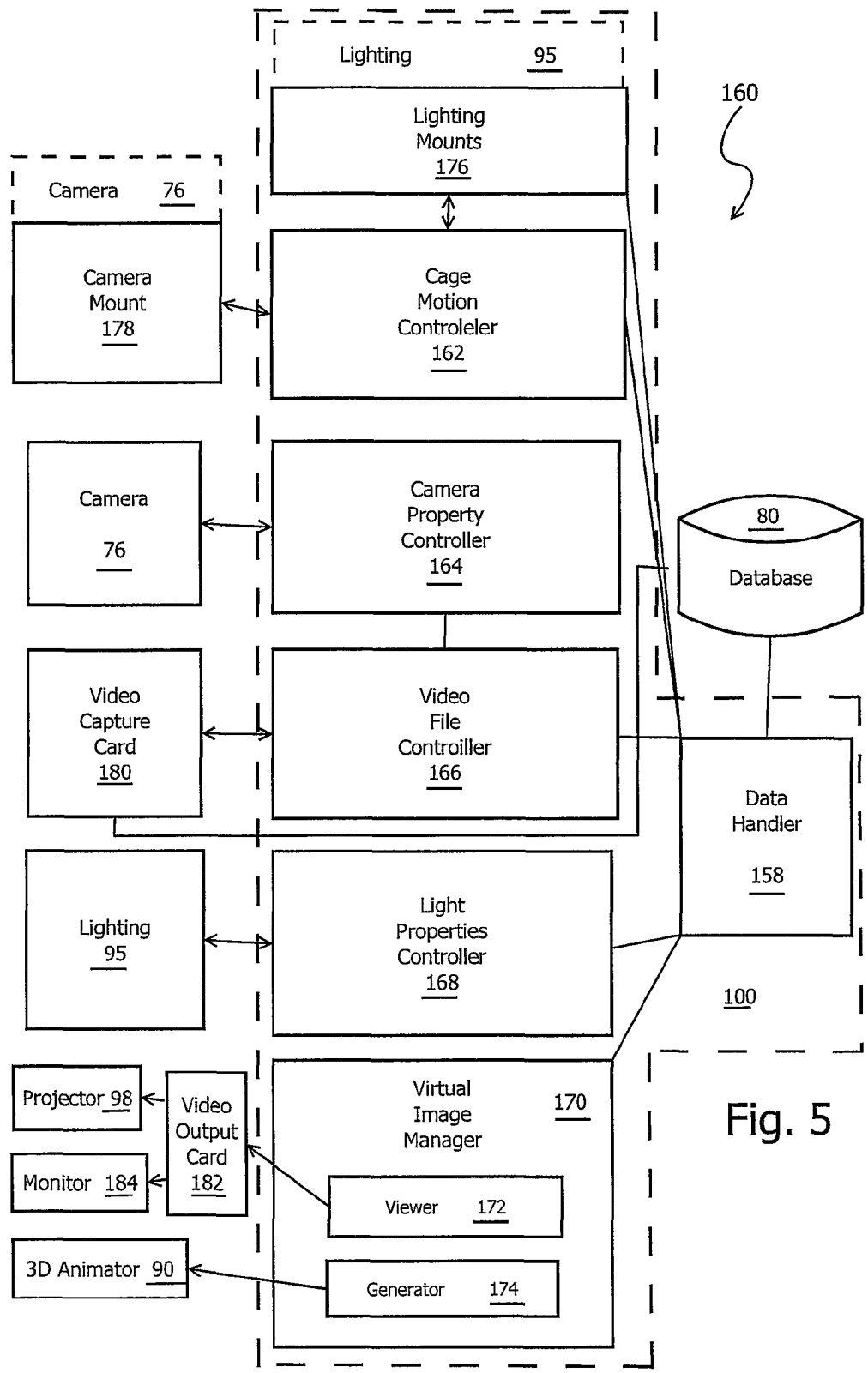
FIG. 5 is a schematic block diagram of one embodiment of a hardware interface system of the virtual director module of FIG. 1.

Referring to FIGS. 4-5, while continuing to refer generally to FIGS. 1-8, referring to FIG. 4, a user interface system 130, a portion of the virtual director module 100 may include a user device 132 on which a user may operate. For example, the user device 132 may be a laptop computer, a desktop computer, a browser on any computer, an application executing on a personal digital assistant, tablet computer, ipad, or the like may represent the user device 132. A user interface module 134 represents the software executing on the user device 132 or accessed through a browser or other link from the user device 132 to the virtual director module 100. Accordingly, the user interface module 134 provides access, communication, inputs to, or retrieval of information from several other modules. Those modules include a shot planner 136. Shot planner 136 includes software, hardware, firmware, and the like, providing backend logic for a user interface 134 that supports process activities like building 114 a scene animatic, discussed previously. For example, the shot planner 136 may include planning for lighting 138*a*, pre-visualization 128*b* of a shot, camera 138*c*, including all camera parameters, and the like. Likewise, the shot planner 136 involves planning for the actions and presentation of lines by actors 138*d*. Similarly, all of the props 138*a*, their positions, their lighting, their visibility, and so forth may be involved in shot planning 136. Likewise, selecting 138*f* individual scenes, selecting 138*g* individual shots, and other decisions 138*h* are typical of the kind that may be made in the shot planner 136. The user interface module 134 allows a user to operate on the device 132 in order to select, review, characterize, set, and so forth all of the components 138 in the shot planner module 136.

Similarly, the shot initializer 140 involves a variety of steps 142 or components 142. The shot initializer may be embodied in software, hardware, firmware, or the like. In one typical embodiment, the shot planner 136 and shot initializer 140 may both be embodied in the software. The software 140 may accommodate the selection of a shot planned 115*a* using scene identifier 142*a*, a shot identifier 142*b*, light actuation 142*c* to turn lights off and on or set them at particular values or into proper position according to the plan 115*a*. Likewise, camera actuation 142*d* may be defined in either an automatic mode 144*a* or a manual mode 144*b*. For example, in an automatic mode 144*a*, a camera 96 may be controlled on the set 94 by actuators operated by software controls from the virtual director module 100. Accordingly, the camera actuation module 142*d* may set those parameters involving all of the parametric controls on the camera 96 as described above, as they are each to be changed over a time line corresponding to a shot, a scene, and so forth. Typically, automatic mode 144*a* may involve automatic control of the real camera 96 as well as automatic control of the virtual camera 92 that must be slaved or should be slaved to the real camera 96. Likewise, synchronization between all of the parameters characterizing each of the cameras 96 on the set 94 may be done by the automatic mode module 144*a*. Similarly, the manual mode 144*b* or the manual module 144*b* may set sensor actuation in order to detect movement of the camera 96, lighting 95, actors 99, and the like. Accordingly, the manual module 144*b* may then synchronize the virtual camera 92 to a manually operated camera 96, and the actual movement of the actors 99, both of which may be provided or equipped with transmitters that can be detected by receivers in order to position and track those foregoing elements in the shot being made on the set 94.

Actor tracking 142*c* may be used to both set focus distances for a camera 96 and to provide automatic movement of lighting 95 to follow an actor 99 movement. Typically, a cinematographer will know how to set a camera 96 or lights 95 for the positioning and movement of an actor 99, including how to control the depth of field. However, these processes can be partly or largely automated, and lighting 95 may need to move with an actor 99, and and thus lighting 95 may be placed on some type of an actuator or drive in order to track an actor 99 who is equipped with a transmission portion of a sensor control for the lighting 95.

Following the initializing of a shot, a shot executor 146 simply implements on the set 94 the parameters planned in 115*a*, and inputted via a user device using the shot planner module 136 of the virtual director module 100

Ultimately, the shot initializer 140 allows the user (the director or other cinematographer) to select a scene, a shot 116, and then setup the lighting 95, controlling all the parameters thereof. Similarly, the shot initializer 140 may optionally call facilitates the controlling and positioning of a camera 96. When a director would call for lights, camera, action, those parameters that must be engaged to control the lights 95, the camera 96 are initiated by the shot initializer 140.

The shot executer 146 controls the systems including those to actually implement the operation of the camera 96 according to the specified parameters, and the operation of the lighting 95 according to the instructions thereof, and so forth. Meanwhile, the virtual camera 92 slaves to the camera 96, and its "perspective" of the virtual set 93 is projected on the screen 102. The shot executer also communicates with the data handler 158 to store all camera 96 shots into a database 80.

The shot reviewer 148 provides for a director to select a particular shot and play it back. Shot reviewer 148 retrieves a video file via the data handler module 158, which controls the database 80, in order to pull from the database 80 the recorded images of the shot selected for review 148. Typically, the shot reviewer may pull the data required to render an image for review to a monitor or the like.

A re-shooter 150 basically returns the lighting 95 and camera 96 to their initial positions and resets all the parameters thereof to the beginning of a shot, as defined by the timeline for the shot animatic planned 115*a* and involving the 3D animator 90. Thus, the set 94 may be highly automated to shoot again and again. Only the actors 99 have to move themselves back to an initial position and repeat their lines, actions, and so forth.

The best shot marker 152 is responsible to allow a user to specify which of several takes of a particular shot is considered best. Ultimately, the default position may be the last shot made or the last take of the shot. The best shot marker may simply set a flag or some boolean operator to indicate that a particular take has that parameter set, and thus when searching for that parameter will be the take provided to the monitor or other output device 104.

The animatic modifier 154 may be engaged by scene and by shot. The modifier 154 determines, or implements, the decision of a director when the director has determined that a virtual, planned 115*a* shot should be replaced by the take of that particular shot 118, done with the real actors 99, real props 97, or the like.

The XML generator 156 is responsible to generate the XML code containing the final scene plan 115, which has become a rough cut scene containing actual best shots (video files) from 124 and 118. The XML file, once generated, is stored in a database 80, and can be opened by a non-linear editor of choice (Avid or Final Cut Pro) to do final editing.

Just as the user interface module 134 allows interaction, including inputs, queries, settings, and the like by a user through the user device 132, the data handler 158 provides interactions between the shot planner 136, shot initializer 140, and other elements 146-156 of the virtual director module 100 and the database 80. Thus, the data handler 158 may quickly provide information from the database 80 to any particular component 136-156 of the virtual director module 100 needing that information. Similarly, the data handler 158 may be responsible to return to the database 80 any outputs generated by any of the components 136-156 of the virtual director module 100, in accordance with the instructions from the user interface module 134.

In general, the data handler 158 may typically include various storage functions such as the ability to name a particular virtual set 93 or model 89, the ability to save, delete, or retrieve any particular model 90, or a virtual set 93 Likewise, the data handler 158 may support shot planner 136 functionality by adding scenes, adding shots, setting camera parameters, setting three-dimensional actors (virtual actors), virtual props, virtual set parameters, and the like Likewise, the data handler 158 may handle video file functions from the shot executer 146. For example, the data handler 158 may set the name, other identification, save video shots, delete video shots, retrieve video shots, and the like in accordance with instructions from the user interface 134.

Referring to FIG. 5, while continuing to refer generally to FIGS. 1-8, a hardware interface system 160 may interact with the database 80, through the data handler 158 in a manner analogous to the interactions of the software side of the virtual director module. For example, in the illustrated embodiment, the hardware interface system 160 may include a cage mount controller 162. The cage mount controller 162 may be responsible to control lights, camera, and action calls made by a director. In the illustrated embodiment, a director may actually provide inputs through a user interface module 134. Those inputs are eventually converted by the virtual director module 100 into parameters, time lines, and the like stored in the database 80. In the database 80 are the record 82*b* that identify the control information required for hardware module 130 to properly perform its responsibilities.

For example, the cage motion control 162 may be responsible to control the movement of a hardware driving lighting 95 and the camera 96. Similarly, a camera property controller 164 may be responsible for currently executing screen shots. That is, the camera property controller may define where each physical camera's parameters should be set, adjust those camera parameters, adjust the cage motion control system to position the camera at the proper position, and share the camera data with other elements, such as the virtual camera 92 Likewise, the camera property controller 164 may be responsible to initiate camera recording of the actual camera 76. Similarly, a video file controller 166 may be responsible to control in real time the video files generated by the camera 96 as a result of imaging or recording the action on the real set 94. Typically, the video file controller will allow the user, typically a director or a filmmaker, to change or accept any particular scene or shot name. That is, the selection may result in a default naming convention that simply sequences a series of names, which indicate something about the scene or the shot, as well as some numerical value identifying the order or sequence in which the scene was shot. Similarly, the video controller may save out of the video files in real time the actual content as well as any parameters corresponding to the camera or lighting conditions under which that content was created. These may all be saved out to the database 80 by the data handler 158 from parameters received by the data handler 158 from the video controller 166.

The light properties controller 168 operates similarly to the camera properties controller 164. For example, this controller 168 for the currently executing shot or scene may be responsible to initiate a method for turning the lights on, the specific coming up of the lights, the timing, the intensity, which lights, and so forth will be engaged. Similarly, this controller 168 may initiate a process establishing the positioning of each light. Thus, not only when the light is on, but when it is off, and where it is located at any particular moment during a shot, scene or the like. Time lines are a key element to control in that a shot is defined by what is happening at a particular time period. That time may be measured in seconds or fractions of a second. Accordingly, the controller 168 may initiate a setting of parameters for each light, including intensity, direction, and the like. Typically, colors may be implemented by filters or by individual lights having fixed filters. Additionally, however, some lights enable color adjustments in real time, via dimmers, between 32K balances, and 56K balanced light. In either event, the light properties controller 168 may be responsible to call all moves, set all parameters, position each light, and determine when that light will be on.

A virtual image manager 170 may include both a viewer 172 and a generator 174 module. The generator module 174 may feed information to a 3D animator 90. Accordingly, the generator module 174 is responsible to manage on behalf of the virtual image manager 170 of the virtual director module 100 the information or controlling parameters passed to the 3D animator 90. Likewise, the virtual image manager 170 may rely on the viewer module 172 to output to the video output card 182 the controlling parameters for controlling a projector 98, a monitor 184, or some other output device 104 that will receive the outputs from the virtual image manager 170. Thus, the virtual image manager controls the creation or generation by the generator 174 and animator 90 of a particular virtual set 93, as well as the playback to a projector 98 or monitor 184 thereof. A fine line exists between the creation and the completion of a shot, a scene, or an entire production or movie. That is, because of the relative flexibility of the virtual director module 100 in controlling both the virtual set 93 and the access to various shots obtained through the shootings 118 of various shots, the virtual image manager 170 may effectively control the incremental creation of the entire movie. Any particular shot may be accepted, and the changes may be implemented by the modified decision 126 of the process 110 of FIG. 3. Thus, the virtual image manager 170 may be responsible to control the creation and the output of a particular shot, a particular scene, or the entire movie, and that the completion may occur when exporting 128 is completed or when editing is being completed. However, the end is not necessarily a particular fixed point in time or place.

The cage motion controller 162 may control such hardware as lighting mounts 176 supporting lighting 95, as well as camera mounts 178 supporting cameras 76. For example, gibs, booms, rail mounts, hand mounts, tripods, and the like may represent camera mounts 178. Typically, rail mounts may provide a mounting system 178 that permits linear translation of a camera, and rotary drives may permit azimuthal angle changes. All of these may be controlled by a cage motion controller 162 directing the position in height, the angle in all three orthogonal axes of the camera line of sight, and so forth.

Typically, the light property controller 168 controls the parameters for the lighting 95, as the camera property controller 164 controls the parameters of the camera 176. Nevertheless, each of these controllers 164, 168, as well as the video file controller 166 receives effectively from the database 80 through the data handler 158 the parametric script that defines the specific settings of parameters in their respective camera 76, video capture card 180, lighting 95, and so forth. Likewise, the cage motion controller 162 may read from a camera mount or read from a lighting mount moved by hand and detected from a transmitter thereon the manual moving of a camera 178 or lighting mount 176 fed back to the database 80 and read out to control the virtual camera 92 of the animator 90. By the same token, the camera mount 178, lighting mount 176, camera 76, the lighting 95, and so forth may be controlled out of the database 80 by information received from the data handler 158 to the appropriate controllers 162-170.

Figure 6:
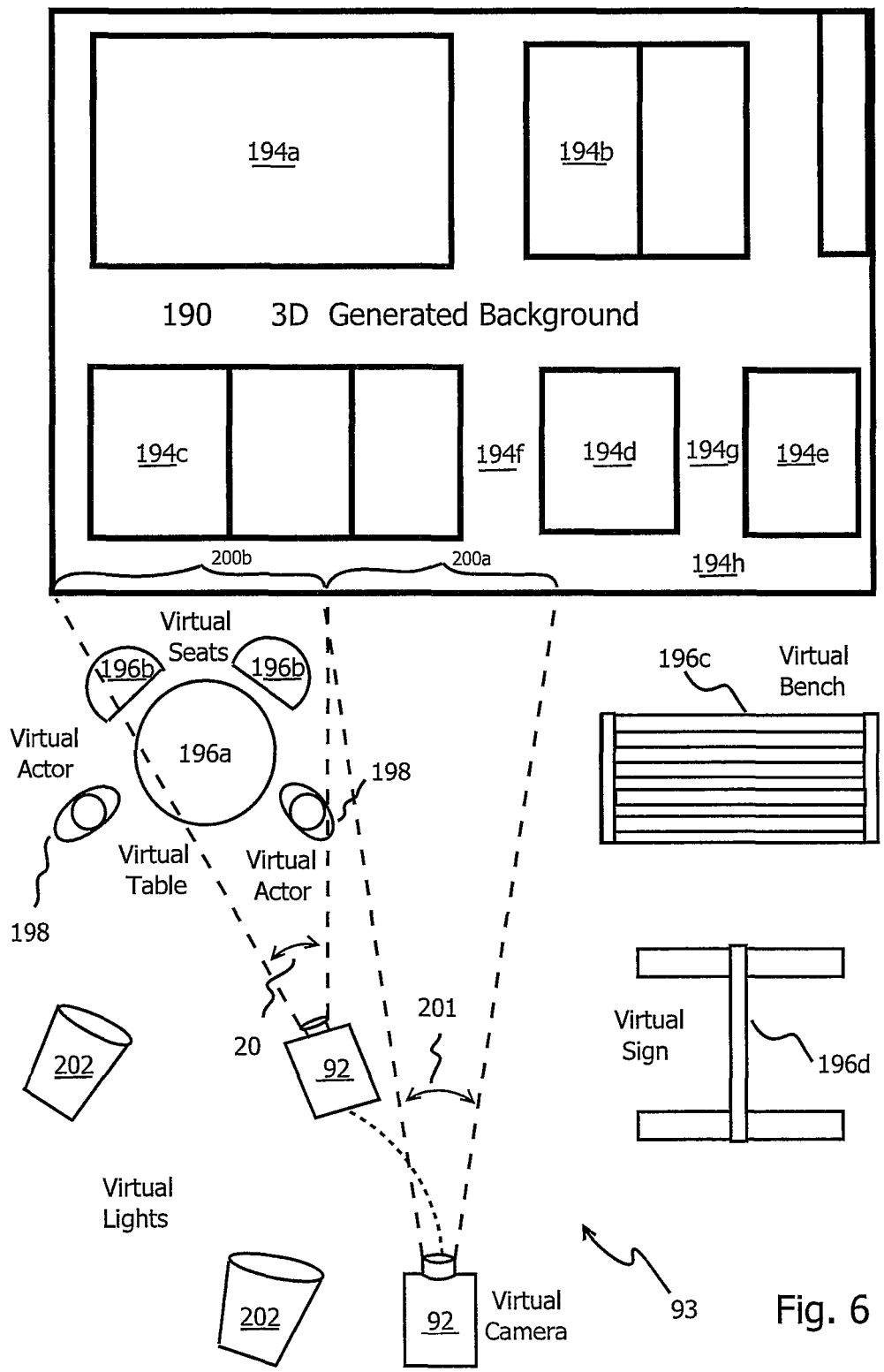
FIG. 6 is a schematic block diagram of a virtual scene as it appears to be, from a top plan view, notwithstanding it is all simply data within a processor and memory.
Figure 7:
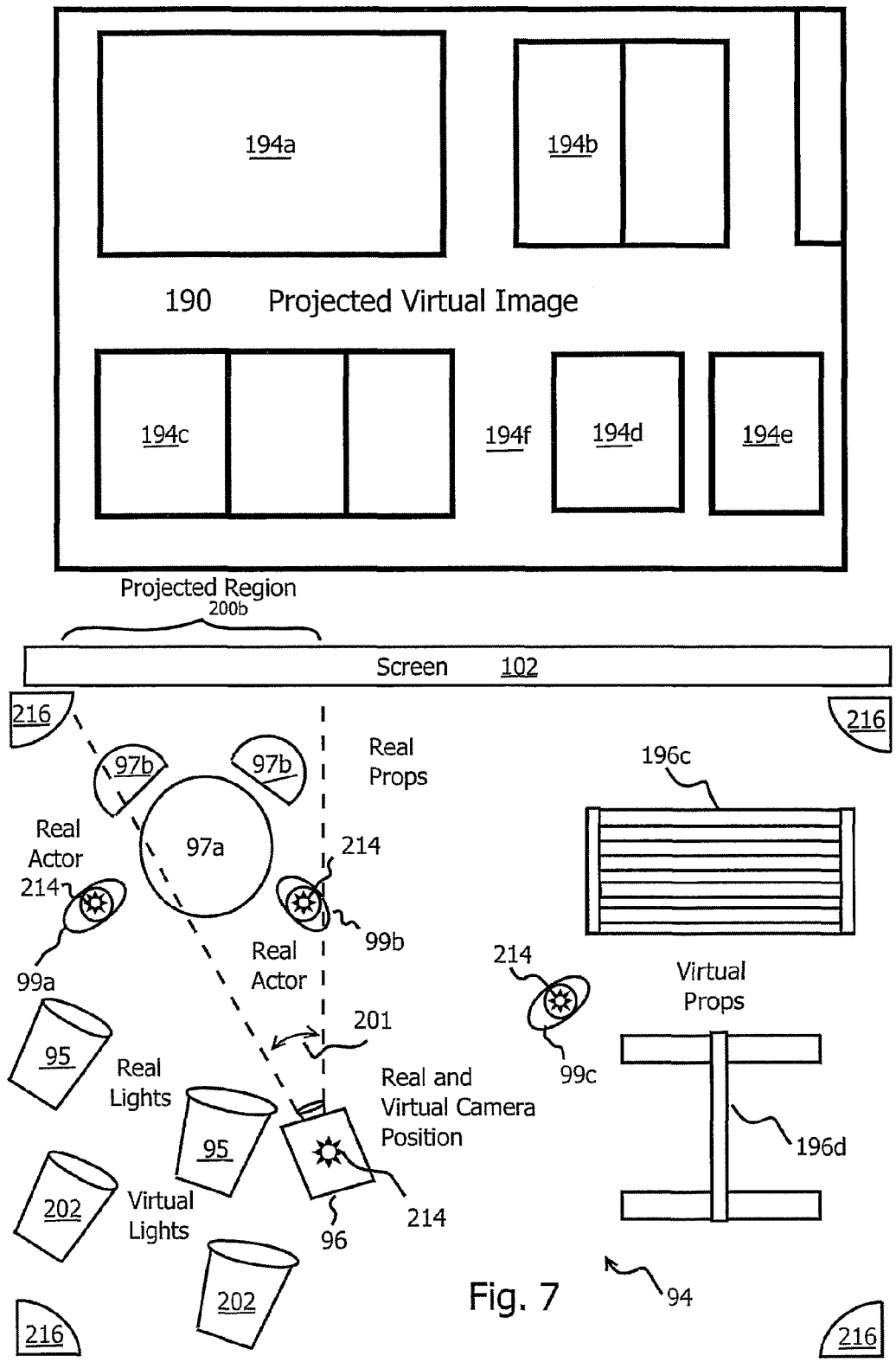
FIG. 7 is a schematic block diagram rendering an actual set, from a top plan view, and showing the virtual projected image, as if it were the background of a physical set, but which is actually projected on a screen, and that is integrated with the image filmed on the real set.

Referring to FIGS. 6-7, while continuing to refer generally to FIGS. 1-8, a virtual set 93 includes elements created by the 3D model 89 by manipulation of that 3D model 89 by the 3D animator 90, as well as inclusion of virtual elements added by the virtual director module 100 to the animator 90. For example, the 3D background 190 of the virtual set 93 includes various features 194. For example, structures 194a, 194b, 194c, 194d, 194e may be buildings, other structures, existing in various heights, widths, and the like. Meanwhile, passages 194f, such as streets 194f or alleys 194g, may exist giving views behind the facades of the other structures 194a-e.

In the illustrated embodiment, a street 194h may proceed along in front of the frontmost row of structures 194c-194e. Thus, a virtual camera 92 may be directed or positioned to view the background 190 from a particular position and at a particular angle with respect to the background 190. As a result of the particular position of the camera 192, a rendering of the background 196 will produce a view of a particular portion at a particular parallax angle. The virtual camera 92 may be placed to identify or image other virtual elements, such as virtual props 196 or virtual prop objects 196, virtual actors 198, and so forth, placed within the virtual set 93 by the virtual director module 100.

In general, the background 190 is generated by the animator 90 as a result of the 3D model 89 animated by the animator 90 according to the positioning of a virtual camera 92 slaved to an actual camera 96 or controlled to operate consistently with directions given to a real camera 96. Thus, in the virtual set 93, a director may execute modules within the virtual director module 100 to place virtual actors 198, a virtual table 196a, virtual seats 196b, a virtual bench 196c, a virtual sign

196d, or any other virtual object 196 in the virtual scene 93. These will be represented by data, placing them in a position at an orientation, having features such as texture, dimension, light reflection, color, and so forth. The features 194 and props 196 combine to make the virtual scene 93. Nevertheless, the features 194 originate with the physical environment 72 that was recorded by a camera 76 and resulted by computer 86 processing that information to create the 3D model 89. In contrast, the director module 100 under the direction of a director may generate from other photographs, or from purely synthetic creations, the props 196, lights 202, actors 198, and the like that will be "seen" by the virtual camera 92.

In the illustrated embodiment, the subtended distance 200 that is seen by the virtual camera 92 will vary with the angle 201 or field of view 201 corresponding to the lens on the virtual camera 92. Of course, the properties of the virtual camera 92 will be selected to match a real camera 96 that will eventually be used. In the stage illustrated in FIG. 6, however, the entire set 93 is virtual. Nevertheless, the subtended distance 200a corresponds to the particular field of view 201 of the camera 92 spaced at its distance and with its angle 201 or field of view 201 at the distance the virtual camera 92 sits with respect to the background 190 Likewise, the position and angle of the camera 92 may be changed to subtend the distance 200b in a closeup shot in which virtual actors 198 are placed near props 196a-196b in close field with respect to the camera 92. In this embodiment, the camera 92 may be set for a short depth of field due to the nature of close work with a lens on a camera 92 while the image from the 3D generated background 190 has the unfocussed look of anything that is outside the depth of field. Nevertheless, the entire virtual scene 93 may be created by the virtual director module instructing the animator 90 as well as inputting additional props, lights, actors, lights, and the like into the virtual set 93.

Referring to FIG. 7, the actual set 94 is shown. In this illustration, real props 97 may replace the virtual props 196 at some point. For example, a real seat 97b or multiple seats 97b may surround a real table 97a. These may replace the virtual seats 196b and virtual table 196a. Likewise, real actors 99a, 99b may replace the virtual actors 198. Additional real actors 99c may be added to the set 94. In the illustrated embodiment, the real camera 96 is co-located with the virtual camera 92. The virtual camera 92 is simply a set of parameters and spacing conditions. Meanwhile, the virtual lights 202 control the lighting on the image displayed by the screen 102. The projected image 190 does not actually exist. That is, this play view of FIG. 7 shows the projected virtual image 190 as if it actually existed behind the screen 102 on which the image of it is projected. Accordingly, the virtual camera 92 provides the projected virtual image 190 on the screen 102 as if the virtual image 190 actually existed at the plan location illustrated in FIG. 7. Thus, the actual camera 96 images the actors 99 as well as the props 97, and the image presented on the screen 102.

Here again, the projected region 200b illustrated in FIG. 7 is that distance, just greater than the subtended distance dictated by the field of view 201 of the camera 96. That angle 201 or field of view 201 dictates that the entire screen 102 need not be seen at this particular setting of this particular camera 96. Meanwhile, real lights 95 illuminate the region around the props 97 and the real actors 99. Nevertheless, if the camera were to slew to the right, changing its azimuthal angle from an axis directed toward the props 97 and the actors 99 and include the actor 99c, no real props 97 would be within the field of view 201. Instead, only virtual props 196c, 196d would exist within the field of view 201. Nevertheless, the camera 96 would still record the virtual props 196c actually projected onto the screen 102, with real actor 99c in the foreground. Likewise, the real camera 96 would actually record the image of the projected virtual image 190 of the background 190 as if it really existed because it does exist as an image on the screen 102.

In the illustrated embodiment, the camera 96 may have a transmitter 214 mounted, preferably centrally, thereto. Likewise, each of the actors 99 may wear a transmitter 214, preferably as close to the center of the actor, and preferably near the head. For example, the transmitter may be a radio frequency transmitter in a hat, on a lapel, on a collar, or the like. Thus, the camera 96 may receive data generated by the detectors 216 detecting the transmitters 214 worn by the actors 99 and associated with the camera 96 in order to tell exactly where each is with respect to the camera 96. In this way, focus distances may be first determined and controlled by 164. Likewise, movement of lighting 95 may be controlled by 162 and 168 to track the proximity of actors 99 and maintain or change a targeted contrast ratio, or other lighting parameter.

Figure 8:
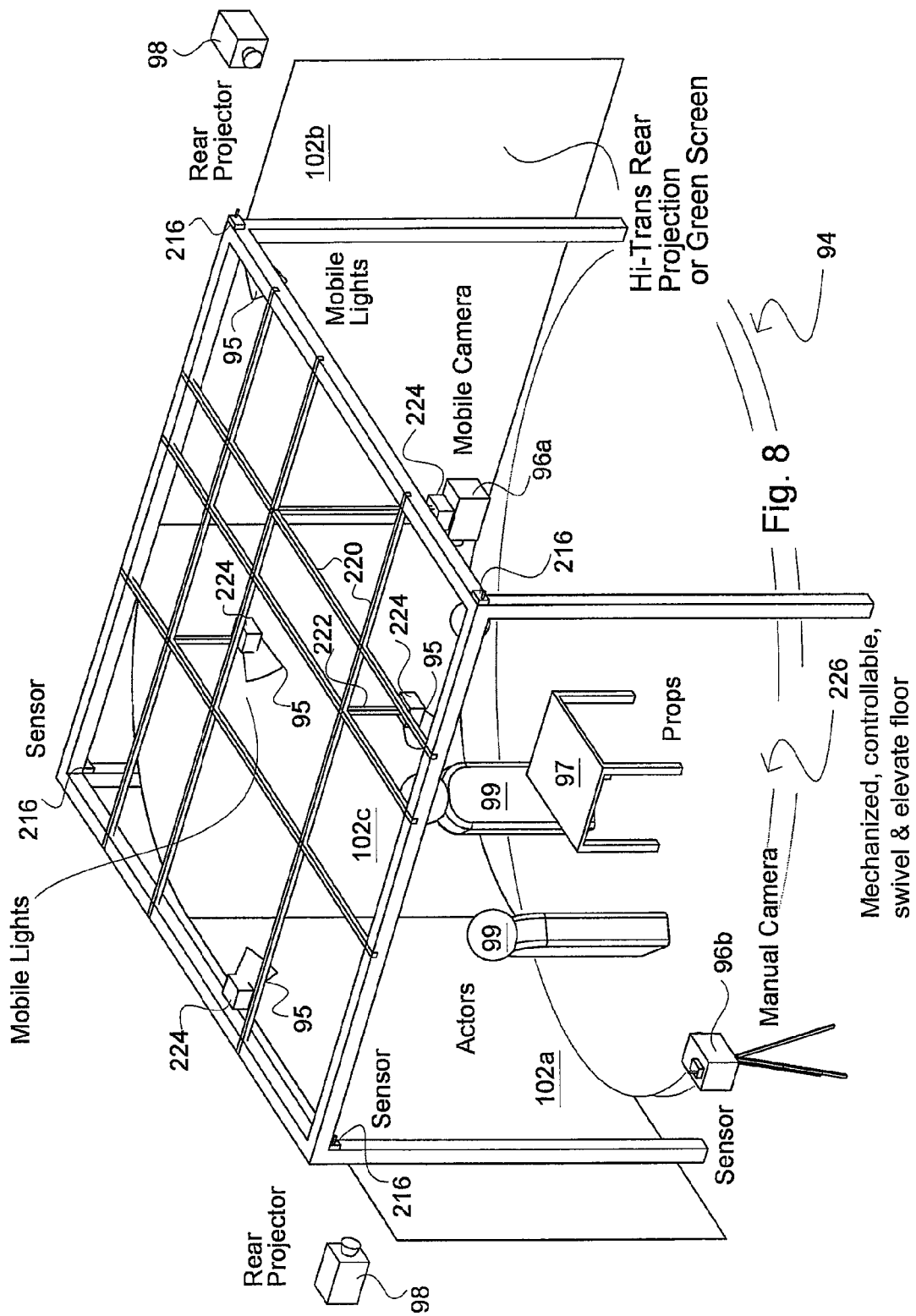
FIG. 8 is a stylized perspective view of one embodiment of a set or studio in which an actual set is created in part by projecting onto one or more screens the background, requiring only the presence of actual actors and foreground props for complete imaging by the camera system and lighting by the lighting system.

Referring to FIG. 8, while continuing to refer generally to FIGS. 1-8, one embodiment of an apparatus and method in accordance with the invention may include a real set 94 that includes not only the usual camera 96, props 97, actors 99, and so forth, but may include various paths 220 for guiding cameras 96 and lighting 95. For example, lighting 95 may be mounted at various locations associated with paths 220 and may be mounted on masts 222. The masts 222 may be telescopically controlled, such that they may extend in length corresponding to altitude in the illustrated embodiment. Likewise, each may be provided with a drive 224. That is, each camera 96 and each or some of the lighting 95 may be provided with a drive to a drive 224 to move that particular camera 96 or light 95 to a particular position, to a particular angle, and so forth. In this way, the entire virtual shot as created by the shot planner 136 and initiated by the shot initializer 140 may be brought to pass with the actors 99, each positioning themselves, moving themselves, and delivering their lines as they move with respect to the screens 102 and props 97 of the actual set 94. The set 94 may have at its foundation a mechanized, controllable, swivel and elevate floor 226, powered by drives and controlled by an extended feature of the cage motion controller 162.

Meanwhile, projection cameras 98 or projectors 98 may project onto the screens 102 images corresponding to the projected virtual image 190 or the background 190 from the animator 90. The entire scene, including the virtual set 93 projected onto the screens 102, which may be multiple, straight, curved, or a combination thereof, are all directed by the director module 100 controlling the projectors 98, the cameras 96, and the localized lighting 95. Meanwhile, the projection by the projectors 98 are controlled by the virtual director module 100 to image the 3D model 89 consistent with the shots being taken by the cameras 96.

The screen 102 may be a green screen, if projectors 98 are not used, and animator 90 outputs to an output device 104 other than a projector 98. Thus, as previously discussed, the virtual director module can be used in set 94, successfully providing alternative green-screen technologies or processes.

In general, the building 114 of a shot, a scene, a movie, is a tactical exercise. That is, tactics involve placing personnel and material in a location for an event. Shooting 118 is an event. Building 114 the virtual set 93 involves placing personnel and material in the proper locations. Accordingly, each must be identified and tracked. Accordingly, the database 80 may include among its various records 82b or other records 82a a list of all actors 99, all properties 97 (props), and so forth.

Likewise, the animator 90 as controlled by the virtual director module 100 must identify every virtual element that reflects an image that is to be interpreted by a viewer as a real element.

Thus, every animation may contain an identifier, a key frame identifier, a model identifier, a properties list, a camera identifier, an actor list, a lighting list, an animation name, and animation number, and so forth. These may be supported by various other database records, fields, tables, and the like.

For example, a table corresponding to the 3D model may contain a model identifier, which may be a key field. Likewise, a model name, a model object, the positional values in directions x, y, and z (linear axial directions) as well as rotational orientations about those axes may be defined. Similarly, some type of a scaling number may also identify sizing to be used in manipulating the image.

In one embodiment, a table of actors may include an actor identifier, which may also be the key field. Similarly, an actor name, an actor model object, as well as positional values in x, y, and z directions and rotations about those axes as well as scaling may be maintained for actors. This information may be provided to the animation table. In other data, the properties list may identify itself by its identifier, which may be its key field, and may include all the table of properties including the identification, name, model object, positional values in x, y, and z space, as well as rotations about those axes, and scaling. This may correspond to the actors and the other models.

Scenes may contain scene identifiers, names, numbers, locations, boolean identifiers for whether the scenes are interior or exterior, a text description of the scene, a shot list for the scene, and so forth. These may all be combined in a table of shots or a shot list that identifies itself and the number of shots to be identified with that shot list. Meanwhile, the scenes may be identified by a table location, which may key on the location identifier, as well as the name of the location, descriptions (such as in text) and some other identifiers, such as streets, cities, zipcodes or other regional identifiers, countries, or even GPS coordinates. The shot list may include a type of identifier for itself as well as the number of shots to be included in that list. These may correspond to a particular scene or to another parameter.

Typically, a shot list will identify shots, which themselves will include records having a shot identifier, typically as a key, a number, a name, a boolean identifier for the categorization of the shot as to whether it represents an actual video or not, and an identifier identifying which animation it pertains to, a textual description of the shot, a flag indicating whether a particular shot is considered the best take, content by way of a video object, boolean indicators or flags identifying whether the shot is interior or exterior, and so forth. Likewise, lighting lists may identify themselves as well as the number of lights or lighting scenarios contained.

Typically, a light table will include an identifier, name, description, looks value, angle value, aperture value, dimming value, color value, spacial position in x, y, and z coordinates, rotation about those axes, and the like. Cameras may be identified in a camera table. In the records 82 of the database 80, each camera may include an identifier, name, a particular identifier for the f-stop, its ISO number, its white balance, the gain number, a number indicating the array size of the image sensor, lens identifiers by manufacturer, parameters such as focal length, aperture size, and so forth.

Likewise, the camera may be positioned in space by x, y, and z values, as well as rotations about those axes. Thus, the database 80 may store records 82 identifying every person and every material or item to be included in a set on a particular shot. In a computerized film (digital camera action) production system, a virtual director module takes responsibility for creating sets, and enabling cinematography, better than green screen technology can, in some common cinematic circumstances, including of shallow depth of field and low light. It also does so less expensively than would be required by alternatively building actual sets in order to shoot with shallow depth of field and low light.

A 3D animator includes a virtual camera and a photorealistic, virtual set created from actual still photography of a physical environment, such as buildings, walls, streets, landscapes, props, and the like. 3D modeling may create fast-viewing and fast-rendering three-dimensional surfaces (skin having the proper texture, elements, images, etc.) but could use the more processor intensive solid modeling. The 3D model is then "rendered" into an "animatic," by a software application, and may include virtual props, lighting, actors, and the like presented by a virtual "camera."

During shooting, and using the animatic as a shooting plan, actual cameras and lights will be controlled to match planned parameters represented by keyframes on a timeline, including these: depth of field, field of view, angle, lighting, movement etc., of an actual camera, and various parameters of actual lights. Alternatively, a camera may be hand held, and its position in 3D space may be instantaneously fed to a system controlling a virtual camera.

The virtual camera is slaved to or driven in accordance with a real camera filming real actors and props in front of a rear-projection screen. Simultaneously, a virtual camera provides inputs to this projection that will be shot as a background by the actual camera in a unique way that preserves image parallax associated with camera movement. Modern digital projectors alleviate many traditional rear-projection problems. And negative images, if any, resulting from rear-projection technologies can be overcome in post-production, using methods that replace projected images with more pristine, model-based renders from the virtual director module, as well as third-party software and hardware.

Such post-production processes are mostly automated, and do not introduce the kinds of problems inherent in green-screen matting/keying processes involving shots with low depth of field and low light. Costly set building can thus be reduced, and significant limitations of green screen technology can thus be overcome, but the system may additionally be used to valuably augment green screen technology applications as well.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

Wherefore, what is claimed is:

1. A method for cinematography comprising:
   providing a synthetic set comprising set images stored in digital data representing a scene comprising images of physical objects;
   directing action before a camera, creating a moving picture comprising a sequence of photographs, while actors being photographed and a camera taking the photographs are both moving;
   recording, by the camera, from a viewing angle that changes with time, the action into a recording of the action; and
   creating a movie scene having the recording and the synthetic set each integrated to display the synthetic set and the action continually from the same perspective, corresponding to the viewing angle of the camera.

2. The method of claim 1, wherein the synthetic set has a physical geometry representing an actual physical location.

3. The method of claim 2, wherein the synthetic set comprises images digitally constructed to represent the actual physical location.

4. The method of claim 2, further comprising generating the synthetic set based on a still photograph of the physical location.

5. The method of claim 4, further comprising calculating by a processor, physical dimensions of the physical location, based on at least one of dimensions and perspective of the still photograph.

6. The method of claim 5, further comprising, creating a digitally stored image of a texture copied from the still photograph.

7. The method of claim 6, further comprising generating the set image by creating a synthetic image using the dimensions, perspective, and texture.

8. The method of claim 7, further comprising rendering the set image in real time, corresponding to the action, from the perspective of the camera during the action.

9. The method of claim 8, further comprising programming the processor to create the set image by generating a model of the physical location based on an input from the camera.

10. The method of claim 9, further comprising projecting the set image onto a screen behind the action and before the camera during the action.

11. A system comprising:
- a camera, configured to record a continual stream of images of actors in motion, constituting a motion picture;
- a processor operably connected to share information with the camera;
- a tracking device operably connected to the camera and the processor to record motion and a viewing angle of the camera and provide corresponding motion data and viewing angle data to the processor;
- the processor programmed with a director module generating a synthetic set corresponding to an image representing a physical environment, time-varying to correspond to the moving picture; and
- the processor, further programmed to select a perspective for the synthetic set corresponding to the viewing angle and motion;
- the processor, further programmed to to generate the synthetic set to appear as if recorded by the camera from the viewing angle and motion.

12. The system of claim 1, further comprising:
- a screen receiving a projection of, and displaying, a background image representing the synthetic set during the recording;
- the camera, including in the recording the background image.

13. The system of claim 12, wherein the screen is a rear-projection screen.

14. The system of claim 11, wherein the processor is further programmed to to create a hybrid movie by adding a background image representing the synthetic set to the motion picture.

15. The system of claim 14, further comprising a projector programmed to project the hybrid moving on a display screen visible to viewers.

* * * * *